(12) United States Patent
Friedrich et al.

(10) Patent No.: US 8,373,618 B2
(45) Date of Patent: Feb. 12, 2013

(54) AUGMENTED-REALITY SYSTEM FOR SITUATION-RELATED SUPPORT OF THE INTERACTION BETWEEN A USER AND AN ENGINEERING APPARATUS

(75) Inventors: Wolfgang Friedrich, Bubenreuth (DE); Wolfgang Wohlgemuth, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1119 days.

(21) Appl. No.: 11/857,931

(22) Filed: Sep. 19, 2007

(65) Prior Publication Data

US 2008/0100570 A1    May 1, 2008

Related U.S. Application Data

(63) Continuation of application No. 09/945,773, filed on Sep. 4, 2001, now Pat. No. 7,324,081, which is a continuation of application No. PCT/DE00/00664, filed on Mar. 2, 2000.

(30) Foreign Application Priority Data

| Mar. 2, 1999 | (DE) | 199 09 009 |
| Mar. 2, 1999 | (DE) | 199 09 010 |
| Mar. 2, 1999 | (DE) | 199 09 011 |
| Mar. 2, 1999 | (DE) | 199 09 012 |
| Mar. 2, 1999 | (DE) | 199 09 013 |
| Mar. 2, 1999 | (DE) | 199 09 016 |
| Mar. 2, 1999 | (DE) | 199 09 018 |
| Mar. 2, 1999 | (DE) | 199 09 023 |
| Mar. 2, 1999 | (DE) | 199 09 154 |

(51) Int. Cl.
*G09G 5/00* (2006.01)

(52) U.S. Cl. .................. 345/7; 345/8; 700/111

(58) Field of Classification Search .................. 345/7–9, 345/156, 1.1–1.3, 629; 700/83, 100–117; 359/13, 630
See application file for complete search history.

(56) References Cited

U.S. PATENT DOCUMENTS

| 4,834,473 A | * | 5/1989 | Keyes et al. ..................... 359/1 |
| 5,475,797 A | | 12/1995 | Glaspy ......................... 700/247 |
| 5,712,649 A | | 1/1998 | Tosaki ............................. 345/8 |
| 5,815,411 A | * | 9/1998 | Ellenby et al. .................. 702/150 |
| 5,850,352 A | | 12/1998 | Moezzi et al. .................. 364/514 |
| 6,037,914 A | | 3/2000 | Robinson ......................... 345/7 |
| 6,255,961 B1 | | 7/2001 | Van Ryzin et al. ...... 340/825.25 |
| 6,345,207 B1 | | 2/2002 | Nitta et al. ..................... 700/83 |
| 6,346,929 B1 | | 2/2002 | Fukushima et al. .............. 345/8 |

FOREIGN PATENT DOCUMENTS

| DE | 4119803 | 6/1991 |
| DE | 4127809 | 8/1991 |
| DE | 4119803 | 12/1992 |
| EP | 0145683 | 9/1984 |
| EP | 0597127 | 4/1993 |

(Continued)

OTHER PUBLICATIONS

"Augmented Reality: An Application of Heads-up Display Technology to Manual Manufacturing Processes", Proc. Hawaii Int'l Conf. System Sciences, Jan. 1992, pp. 659-669. (T. Caudell et al).*

(Continued)

*Primary Examiner* — Hong Zhou
(74) *Attorney, Agent, or Firm* — King & Spalding L.L.P.

(57) ABSTRACT

The invention relates to an augmented-reality system having a mobile apparatus for the context-dependent insertion of assembly instructions. The context-dependent insertion of assembly instructions with process-optimized allocation of the necessary work steps provides situation-related support by for work sequences.

13 Claims, 3 Drawing Sheets

FOREIGN PATENT DOCUMENTS

| | | |
|---|---|---|
| EP | 0716364 A1 | 6/1996 |
| GB | 2284074 | 4/1994 |
| GB | 2327289 | 7/1998 |
| GB | 2327289 | 1/1999 |
| JP | 7311857 A | 11/1995 |
| JP | 8005954 A | 1/1996 |
| JP | 8161028 A | 6/1996 |
| JP | 10148694 A | 6/1998 |
| JP | 10214035 A | 8/1998 |
| JP | 10222543 A | 8/1998 |
| JP | 10293790 A | 11/1998 |
| JP | 11041166 A | 2/1999 |
| WO | WO95/05620 | 2/1995 |

OTHER PUBLICATIONS

Rekimoto et al., "Augment-able Reality: Situated Communication Through Physical and Digital Spaces," IEEE paper, presented at International Symposium on Wearable Computers, pp. 68-75, Pittsburgh, PA, Oct. 1998.*

Rekimoto et al., "The World through the Computer: Computer Augmented Interaction with Real World Environments", UIST '95. 8th Annual Symposium on User Interface Software and Technology. Proceedings of the ACM Symposium on User Interface Software and Technology, Pittsburgh, PA Nov. 14-17, 1995, pp. 29-36, © 1995 ACM 0-89791-709-x/11.*

Japanese Office Action, Application No. 2000-602895, 6 pages, Jul. 7, 2009.

XP000585192: Daude R. et al: "Head-Mounted Display als facharbeiter-orientierte Unterstützungskomponente an CNC-Werkszeugmaaschinen" Werkstatechnik; S. 248-252.

XP000426833: Kuzuoka H: "Spatial workspace collaboration: A shareview video support system for remote collaboration capability"; S. 533-540.

International Search Report; PCT/DE 00/00664; pp. 3, Mar. 2, 2000.

Hideaki Kuzuoka; "Spatial Workspace Collaboration: A Sharedview Video Support System for Remote Collaboration Capability"; Proceedings of the conference on human factors in computing systems, US, Reading, Addison Wesley; pp. 533-540, 1992.

R. Daude et al.; "Head Mounted Displays Als Facharbeiterorientierte Unterstützungskomponente an CNC-Werkzeugmaschinen"; Werkstatttechnik, Springer-Verlag, Berlin, Bd. 86, Nr. 5, 1. pp. 248-252, 1996.

Japanese Office Action, Application No. 2000-602895, 10 pages, Mar. 25, 2010.

Japanese Office Action, Japan Application No. 2000-602895, 13 pages, Jun. 21, 2010.

* cited by examiner

AUGMENTED-REALITY SYSTEM FOR SITUATION-RELATED SUPPORT OF THE INTERACTION BETWEEN A USER AND AN ENGINEERING APPARATUS

CROSS-REFERENCES

This application is a continuation of U.S. patent application Ser. No. 09/945,773 filed Sep. 4, 2001 now U.S. Pat. No. 7,324,081; which is a continuation of International application number PCT/DE00/00664 filed Mar. 2, 2000, which designated the United States of America, and claims priority of German application number DE 199 09 154.4, German application number 199 09 023.8, German application number DE 199 09 018.1, German application number DE 199 09 012.2, German application number DE 199 09 011.4, German application number DE 199 09 010.6, German application number DE 199 09 013.0, German application number DE 199 09 009.2, and German application number DE 199 09 016.5, all of which were filed Mar. 2, 1999, and the contents of which are hereby incorporated by reference in their entirety.

FIELD OF THE INVENTION

The invention relates to an augmented-reality system for situation-related support of the interaction between a user and an engineering apparatus. Such a system and method may be used in the field of automation technology, for production machinery and machine tools, in diagnostic/service support systems, and for complex components, equipment and systems, such as vehicles and industrial machinery and installations.

BACKGROUND OF THE INVENTION

GB 2 327 289 discloses a work-support apparatus which uses a display which allows an assembly line worker to simultaneously visualize instructions relating to the work to be carried out and information about results of this work. The results of the work are recorded by measuring means, or by the worker entering a specific part number, with the work process being recorded by one or more cameras.

SUMMARY OF THE INVENTION

The present invention provides a system and a method which, in concrete operating situations, permit rapid and reliable support for a user in a simple and cost-effective manner. Further, the invention is based on the insight that the user of an engineering apparatus generally needs to complete certain training sessions before he is able to carry out more complex engineering work, such as producing an intermediate and/or final product up to assembling a car. Process-optimized use of such an operator can be achieved where the operator is supported by an augmented-reality system related to the relevant process situation. In this context, real information, for example the initial state of a part which is to be produced, is recorded and the system uses this to ascertain, in context-dependent fashion, the coming work sequences for the user and displays them for the user in a mobile apparatus.

In particular in NC-controlled applications, the opportunity to insert simulation data provides further additional support for the worker. In this context, the augmented-reality system can be used to overlay computer-generated visualizations on real information based on simulated data. This provides support for setting up numerical control, a.k.a. NC-controlled processes/applications.

In a preferred embodiment of the present invention, documentation data is either static or dynamic information data. Examples of static information are engineering data from handbooks, exploded drawings, maintenance instructions, etc. Examples of dynamic information are process values such as temperature, pressure, signals, etc.

In a further preferred embodiment of the invention, rapid situation-related access to the documentation data is provided by a recording means having an image-sensing apparatus. An evaluation means for evaluating the real information such that an object of the documentation data may be ascertained from the real information, and by a visualization means for visualizing the documentation data. Rapid situation-related access to the documentation data is further supported by virtue of the recording means being user-controlled and being, in particular, in the form of voice-controlled recording means and/or recording means controlled by control data.

Augmented-reality techniques on the basis of the static and/or dynamic documentation and/or process data can be used in a manner which is optimal for a large number of applications by virtue of the recording means and/or the visualization means being in the form of data goggles.

BRIEF DESCRIPTION OF THE DRAWINGS

The present invention is described in greater detail and explained below using the exemplary embodiments shown in the drawings, in which.

DETAILED DESCRIPTION OF THE INVENTION

Figure 1:
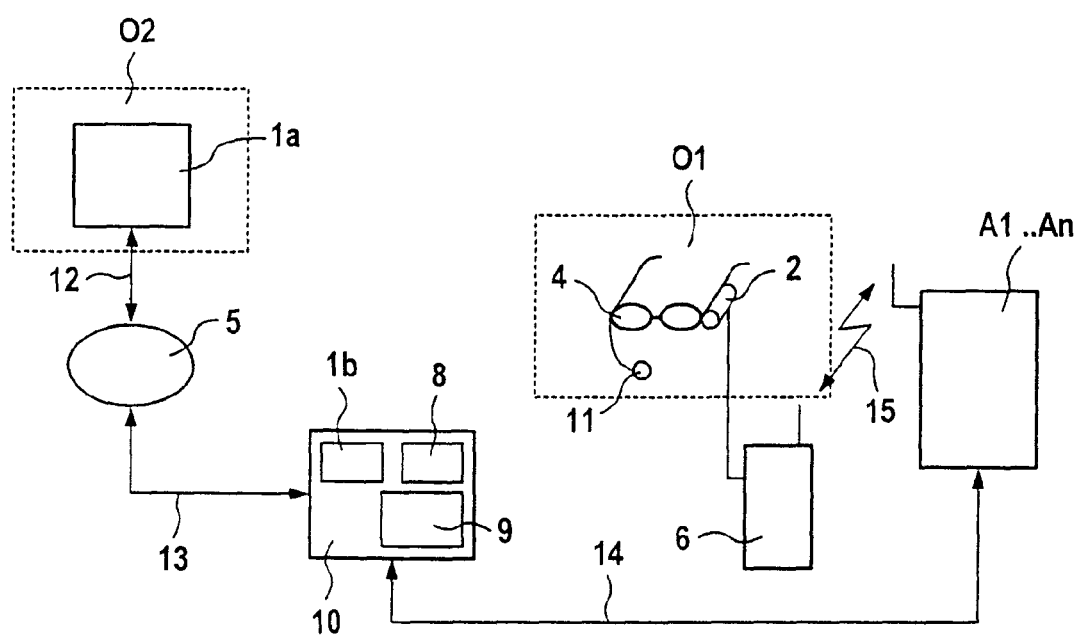
FIG. 1 illustrates a block diagram of a first exemplary embodiment of an augmented-reality system.

FIG. 1 shows a basic illustration of an augmented-reality system for transmitting first information data from a first location O1 to a remote second location O2 of an expert in order for a user at the first location O1 to be supported by the remote expert at the second location, for example in the case of servicing and/or repair. The user, who is not shown in FIG. 1, is equipped with mobile equipment 4, 6. The mobile equipment 4, 6 comprises data goggles 4 holding a video camera 2 and a microphone 11. The data goggles are coupled to a device for wireless communication, for example a radio transceiver apparatus 6 which can communicate with the automation system A1-An via a radio interface 15. The automation system A1-An can be coupled by means of a data link 14 to an augmented-reality system 10, which is also referred to as "AR system". The AR system contains an information module 1b for storing or accessing information data, an AR base module 8, and an AR application module 9. The AR system 10 can be connected to the Internet 5 by means of a data link 13, with an internet connection 12 (shown by way of example) permitting access to further memory and documentation data 1a.

When equipped with the data goggles 4, and the mobile radio transmission device 6, a worker can move freely in the installation A1-An for maintenance and servicing purposes. If, by way of example, maintenance or repair of a particular subcomponent in the installations A1-An is necessary, the camera 2 on the data goggles 4 is used, possibly controlled by voice commands recorded by the microphone 11, to set up appropriate access to the relevant documentation data 1a, 1b. The radio interface 15 is used to set up a data link to the installation A1-An or to an appropriate radio transmission module, and to transmit the data to the AR system 10. In the AR system, the data obtained from the user are evaluated in relation to the situation, and information data 1a, 1b are accessed automatically or under interactive control by the user. The relevant documentation data 1a, 1b ascertained are transmitted to the radio transmission device 6 via the data links 14, 15, and, on the basis of the operating situation recorded. An analysis is thus performed which is the basis of the selection of data from the available static information. This results in situation-related, object-oriented or component-oriented selection of relevant knowledge from the most up-to-date data sources 1a, 1b. The information is displayed using the respective visualization component such as a handheld PC or data goggles. The user is thus provided in situ with only the information needed. This information is always at the most up-to-date level and accordingly, the service technician is not overloaded with unnecessary or out-of-date information.

Figure 2:
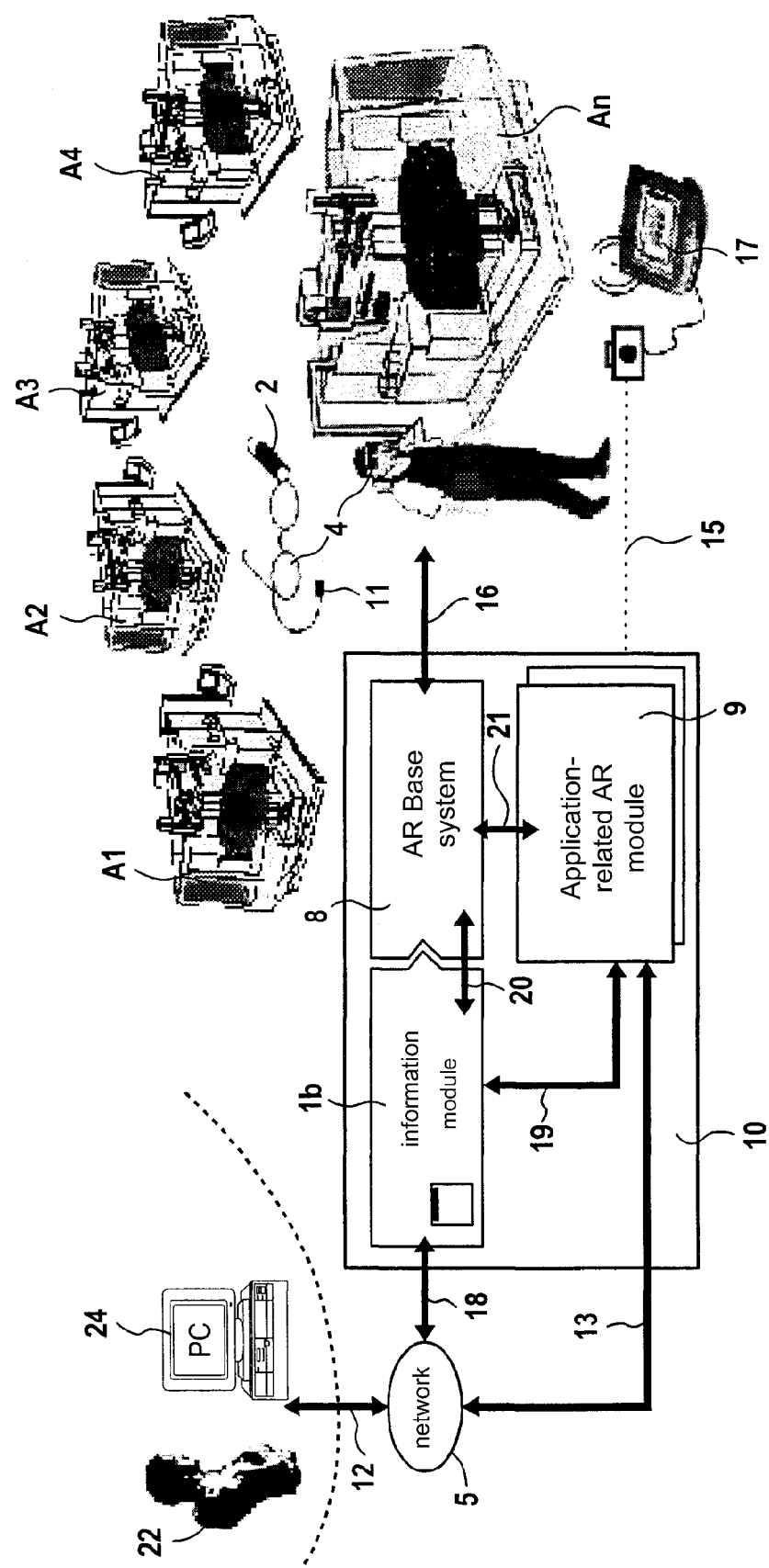
FIG. 2 illustrates another block diagram of an exemplary embodiment of an augmented-reality system.

FIG. 2 shows another application example of a system for documentation processing for servicing and maintenance. The system comprises an augmented-reality system 10 which contains an information module 1b for storing information data, an AR base system 8 and an AR application module 9. The AR system 10 can be coupled to the Internet 5 by means of link lines 13, 18. From the Internet, an illustrative data link 12 can be used to connect to a remote PC 16 with a remote expert 22. The individual modules of the AR system 10 are coupled together by means of connections 19, 20, 21. The communication between a user 7 and the AR system takes place via interfaces 8, 23. The AR system can be coupled to a transceiver apparatus which permits two-way data communication between the AR system 10 and the user 7, using data goggles 4, either directly via the interface 8, or via an interface 23 using a radio transceiver device 17, located in the area of the user 7. The connection 23 can be produced using a separate data link or using the electricity mains in the form of a "power-line" modem. Besides a display apparatus in the area of the goggle lenses, the data goggles 4 contain an image-sensing apparatus 2 in the form of a camera, as well as a microphone 11. The user 7 can move throughout the installations A1-An using the data goggles 4 and can carry out servicing or maintenance work.

The data goggles 4 and the corresponding radio transceiver apparatuses, for example the radio transceiver apparatus 17 worn by a worker, have a prophylactic functionality in that the respective operating situation is recorded, for example by the camera 2, or by localization by the staff 7. On the basis of the recorded operating situation, the AR system selects data for the installation A1-An being maintained. The fundamental advantage of the system shown in FIG. 2 is that this system supports the interaction of the individual single functionalities on an application-related basis. Thus, a concrete operating situation is first recorded automatically and this operating situation is then analyzed, with the currently relevant aspects being automatically ascertained from the most up-to-date, available static information in combination with the presently recorded dynamic data. Accordingly, assembly instructions, for example, are correlated to current process data. This provides the work staff 7 with a situation-related display of the relevant information, by means of an overlayed visualization of the appropriate data such that the real operating situation is extended by the ascertained information in the field of view of the staff. This quickly equips the staff 7 to take action, and hence safeguards necessary machine execution times. The maintenance technician 7 can also obtain support in situ from the remote expert 22 and the knowledge 16 available at the location of the remote expert 22.

Figure 3:
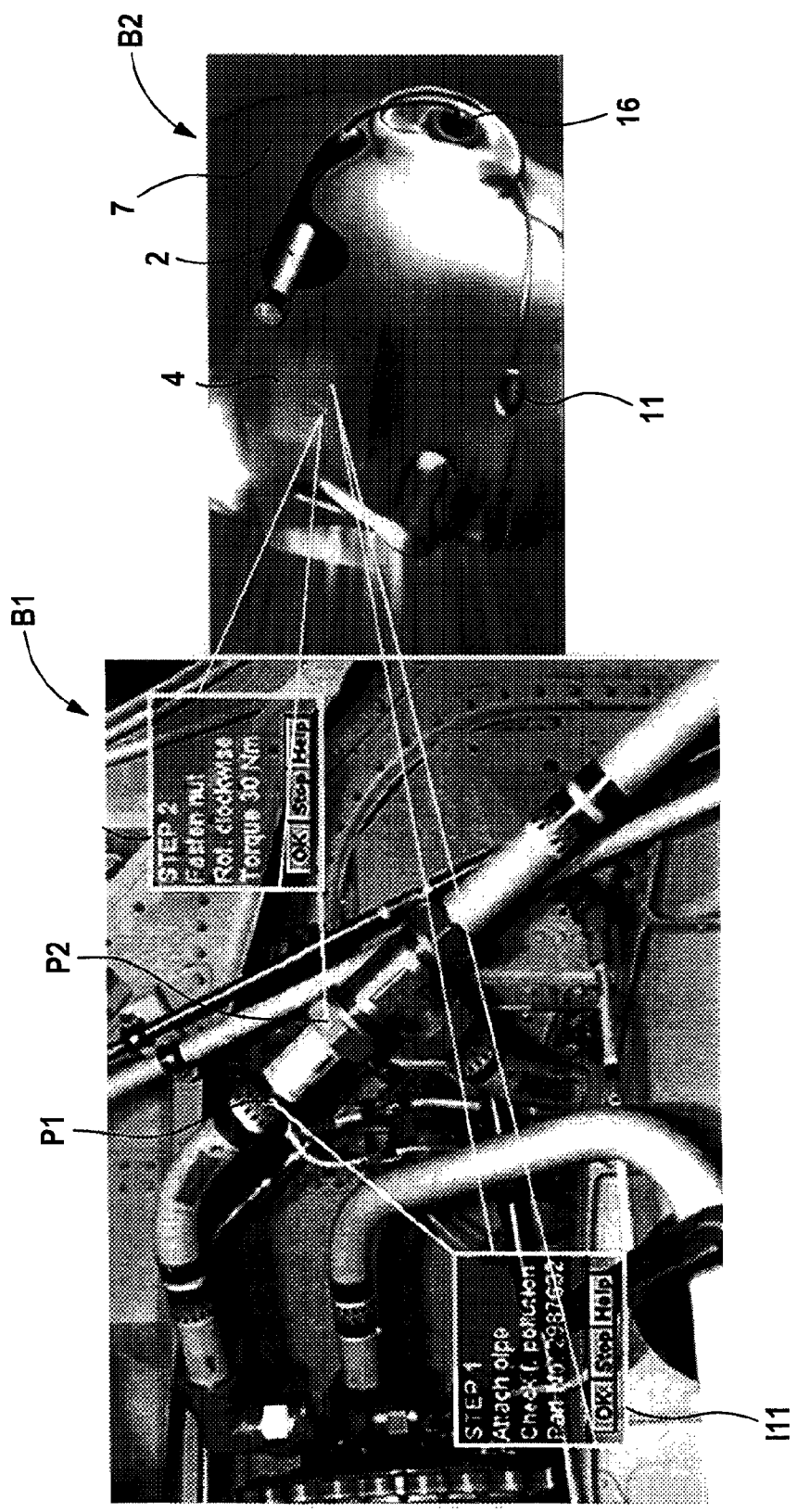
FIG. 3 illustrates an application example of situation-related access to expert knowledge and/or documentation data.

FIG. 3 shows an application example of situation-related access to documentation data. FIG. 3 shows a first screen area B1 showing an installation component. The right-hand screen area B2 shows a user 7 looking at an individual installation component, for example. The user 7 is equipped with data goggles 4 containing a camera 2. The data goggles 4 additionally hold a microphone 11 and a loudspeaker 16. The left-hand screen area B1 shows a view of pipelines which can be observed using the data goggles shown in the image window B2. In the left-hand screen area B1, two points P1, P2 are marked which represent two image details observed using the data goggles 4. After observation of the first point P1 (the pipeline arranged in the area of the point P1), additional information is visualized in the data goggles 4 for the user 7. This additional information I11 comprises documentation data for the first point P1 which contain work instructions for this pipeline, and for the point P2 contain the installation instruction to be carried out in a second step. In this case, the installation instruction results in the user 7 being informed of the torque and the direction of rotation of the screw connection at the point P2 by means of visualization of the supplementary data I12. The user 7 thus very quickly obtains a situation-related instruction for the object being observed. If an intelligent tool is used which is capable of recording the torque currently being used, it is also possible for the user to be instructed to increase or decrease the torque appropriately on the basis of the current torque.

Further background information is provided below on the fields of use of the present invention. Application-oriented requirement analysis and development of AR-based systems are useful in supporting work processes in development, production and servicing of complex engineering products, installations in fabrication and process technology, service support systems, as in the case of motor vehicles, or for maintenance of any engineering equipment.

Augmented reality, "AR" is a novel type of man-machine interaction with great potential for supporting industrial work processes. With this technology, the observer's field of view is enriched with computer-generated virtual objects, which means that product or process information can be used intuitively. Besides the very simple interaction, the use of portable computers opens up AR application fields with high mobility requirements, for example if process, measurement or simulation data are linked to the real object.

Today German industry is characterized by increasing customer requirements in terms of individuality and quality of products and by the development processes taking substantially less time. Especially in developing, producing and servicing complex engineering products and installations, it is possible, by means of innovative solutions to man-machine interaction, both to achieve increases in efficiency and productivity and to design work so as to enhance competence and training, by the user's need for knowledge and information being supplied in a situation-related manner on the basis of up-to-date data.

Augmented reality is a technology with numerous innovative fields of application:
In development for example, a "mixed mock-up" approach based on a mixed-virtual environment can result in a distinct acceleration of the early phases of development. Compared with immersive "virtual reality" (VR) solutions, the user is at a substantial advantage in that the haptic properties can be depicted faithfully with the aid of a real model, whereas aspects of visual perception, e.g. for display variants, can be manipulated in a virtual manner. In addition, there is a major potential for user-oriented validation of computer-assisted models, e.g. for component verification or in crash tests.

In flexible production, it is possible, inter alia, to considerably facilitate the process of setting up machinery for qualified skilled workers by displaying, e.g. via mobile AR components, mixed-virtual clamping situations directly in the field of view. Fabrication planning and fabrication control appropriate to the skilled worker in the workshop is facilitated if information regarding the respective order status is perceived directly in situ in connection with the corresponding products. This also applies to assembly, with the option of presenting the individual work steps to the assembler in a mixed-virtual manner in the actual training phase. In this connection, it is possible, e.g. by comparing real assembly procedures with results of simulations, to achieve comprehensive optimizations which both improve the quality of work scheduling and simplify and accelerate the assembly process in the critical start-up phase Finally, regarding servicing, conventional technologies are by now barely adequate for supporting and documenting the complex diagnostic and repair procedures. Since, however, these processes in many fields are in any case planned on the basis of digital data, AR technologies provide the option of adopting the information sources for maintenance purposes and of explaining the dismantling process to an engineer, e.g. in the data goggles, by overlaying real objects. Regarding cooperative work, the AR-assisted "remote eye" permits a distributed problem solution by virtue of a remote expert communicating across global distances with the member of staff in situ. This case is particularly relevant for the predominantly medium-sized machine tool manufacturers. Because of globalization, they are forced to set up worldwide production sites for their customers. However, it is not practical to have a presence in all the important markets, nor is it possible to dispense with the profound knowledge of experienced service staff of the parent company with respect to the increasingly more complex installations.

The special feature of man-machine interaction in augmented reality is the very simple and intuitive communication with the computer, supplemented, for example, by multimode interaction techniques such as voice processing or gesture recognition. The use of portable computer units additionally enables entirely novel mobile utilization scenarios, with the option of requesting the specific data at any time via a wireless network. Novel visualization techniques permit direct annotation, e.g. of measured data or simulation data, to the real object or into the real environment. In conjunction with distributed applications, a number of users are able to operate in a real environment with the aid of a shared database (shared augmented environments) or to cooperate in different environments with AR support.

Augmented reality has been the subject of intense research only in the last few years. Consequently, only a few applications exist, either at the national or the international level, usually in the form of scientific prototypes in research establishments.

U.S.A.: As with many novel technologies, the potential uses of augmented reality were first tapped in North America. Examples include cockpit design or maintenance of mechatronic equipment. The aircraft manufacturer Boeing has already carried out initial field trials using AR technology in the assembly field. The upshot is that in this hi-tech area too, the U.S.A. occupies a key position, potentially making it a technological leader.

Japan: Various AR developments are being pushed in Japan, e.g. for mixed-virtual building design, telepresence or "cyber-shopping". The nucleus is formed by the Mixed Reality Systems Laboratory founded in 1997, which is supported jointly as a center of competence by science and by commerce and industry. Particular stimuli in the consumer goods field are likely in the future from the Japanese home electronics industry.

Europe: So far, only very few research groups have been active in Europe in the AR field. One group at the University of Vienna is working on approaches to mixed-real visualization. The IGD group, as part of the ACTS project CICC, which has now come to an end, has developed initial applications for the building industry and a scientific prototype for staff training in car manufacturing.

Thus the invention should be seen in particular in the context of specific fields of application, including "production machinery and machine tools" (NC-controlled, automation-technology processes), and "diagnostics/service support systems for complex engineering components/equipment/systems" (e.g. vehicles, but also industrial machinery and installations).

The order of the work steps is improved by means of "appropriate" perception of environment and situation. The respective combination of work environment, process situation, progress of the activity and knowledge of the staff is utilized to relativize the next succession of instructions. The basic idea is context-dependent insertion of assembly instructions with process-optimized allocation of the necessary work steps. The conceivable optimization can have parameters set for it, e.g. in terms of particular resource use (time, material, cost etc).

In summary, the invention relates to an augmented-reality system having a mobile apparatus for context-dependent insertion of assembly instructions. The context-dependent insertion of assembly instructions with process-optimized stipulation of the necessary work steps provides situation-related support by for work sequences. In addition, further supplementary instructions relating to the respective operating situation can be inserted for the user, for example on the basis of particular assembly steps etc., i.e. in the case of a firmly prescribed assembly procedure. Thus, by way of example, preventive maintenance instructions etc. can be given in context-dependent fashion with optimization of the timing and process.

We claim:

1. A situation-related support system for the interaction between a user and an apparatus comprising:

mobile equipment comprising:
a video camera for providing images of a current field of view of the user, including at least parts of the apparatus and a display, and
voice recording means for receiving voice data from the user, a device for wireless communication coupled with said mobile equipment, an augmented reality system comprising:
means for an analysis of video images which have been recorded by the video camera and have been wirelessly transmitted by the device for wireless communication to the augmented reality system,
means for automatically identifying one or more objects based on the analysis of the recorded video images;

means for automatically determining a particular situational context based on voice data received from the user via the voice recording means;

means for (a) automatically accessing documentation data related to the automatically identified one or more objects, wherein said documentation data related to the automatically identified one or more objects includes different data associated with different situational contexts, and (b) identifying from said documentation data the data associated with the particular situational context determined based on the voice data from the user, and means for transmitting the context-relevant data to the device for wireless communication, wherein the display in the mobile equipment displays the context-relevant data.

2. The system according to claim 1, wherein the apparatus is an industrial installation.

3. The system according to claim 2, wherein the industrial installation comprises a further device for wireless communication and a communication means coupled with said augmented reality system.

4. The system according to claim 1, wherein the voice recording means comprises a microphone.

5. The system according to claim 1, wherein the display is located on lenses of data goggles, the video camera is an image-sensing apparatus located on the data goggles, and a microphone is located on the data goggles.

6. A situation-related support method for interaction between a user and an industrial installation, comprising the steps of:

recording video images of at least a part of said industrial installation by a mobile equipment comprising a video camera, voice recording means and a display, the at least a part of said industrial installation being within a field of view of the user;

transmitting voice data of the user from the mobile equipment to an automation system associated with said industrial installation;

wirelessly transmitting the video images from the mobile equipment to the automation system by a device, transmitting said video images and voice data from the automation system associated with the industrial installation to an augmented reality system;

analyzing the video images in the augmented reality system, automatically identifying one or more objects based on the analysis of the recorded video images, automatically determining a particular situational context based on voice data received from the user via the voice recording means;

automatically accessing documentation data in the augmented reality system related to the automatically identified one or more objects, wherein said documentation data related to the automatically identified one or more objects includes different data associated with different situational contexts, identifying from said documentation data the data associated with the determined particular situational context, transmitting the context-relevant data, to the device for wireless communication, displaying the context-relevant data.

7. The method according to claim 6, wherein the voice recording means comprises a microphone.

8. The method according to claim 6, wherein the display is arranged in data goggles and provides additional information in a field of view of a user and wherein the context-relevant data are overlayed in the field of view of the user.

9. The method according to claim 6, wherein the step of accessing documentation data comprises the step of accessing a remote data base or a remote expert.

10. A method for providing situational support to a user, comprising:

determining an industrial installation which requires service or repair;

recording voice data of the user, recording video images of a portion of the industrial installation including multiple particular components;

wirelessly transmitting the video images and voice data to an augmented reality system;

analyzing the video images, identifying each of the multiple particular components from the video images, and accessing documentation data for each of said multiple particular components depending on the analysis;

determining from said documentation data and said voice data from said user a context-dependent instruction sequence, the context-dependent instruction sequence comprising instructions regarding each of the multiple particular components, and being pre-associated with a particular situational context determined based on the voice data from said user; and displaying the context-dependent instruction sequence such that the user may view the context-dependent instructions substantially simultaneously with the component of the industrial installation, and such that the instructions regarding each of the multiple particular components are displayed in association with each of the multiple particular components simultaneously.

11. The method of claim 10, further comprising an intelligent tool operated by the user, wherein the method further comprises the step of receiving information from said intelligent tool and instructing the user how to operate said intelligent tool.

12. The method of claim 10, wherein the step of analyzing the video images comprises the step of determining at least one point of said industrial installation within an video image and displaying instructions in a field of view of the user relating to said one point.

13. The method of claim 12, wherein said instructions are displayed in a window and a graphical connection is drawn from said window to said one point.

* * * * *